United States Patent [19]

Le Loarer et al.

[11] Patent Number: 6,103,917
[45] Date of Patent: Aug. 15, 2000

[54] METHOD FOR REGENERATING ANTHRAQUINONE DERIVATIVES DURING A SYNTHESIS PROCESS OF HYDROGEN PEROXIDE 30

[75] Inventors: Jean-Luc Le Loarer; Christophe Nedez, both of Salindres; Bernard Taxil, Vif, all of France

[73] Assignee: Procatalyse S.A., Rueil Malmaison, France

[21] Appl. No.: 09/297,026

[22] PCT Filed: Oct. 24, 1997

[86] PCT No.: PCT/FR97/01909

§ 371 Date: Jul. 27, 1999

§ 102(e) Date: Jul. 27, 1999

[87] PCT Pub. No.: WO98/18715

PCT Pub. Date: May 7, 1998

[30] Foreign Application Priority Data

Oct. 25, 1996 [FR] France .................................. 96 13028

[51] Int. Cl.$^7$ .......................... C07C 45/27; C01B 15/023
[52] U.S. Cl. ............................................. 552/208; 423/588
[58] Field of Search ...................... 552/502, 208; 423/588, 587

[56] References Cited

U.S. PATENT DOCUMENTS

| | | | |
|---|---|---|---|
| 3,565,581 | 2/1971 | Lee et al. ................................... | 23/207 |
| 3,912,766 | 10/1975 | Logan et al. ............................ | 260/396 |
| 4,566,998 | 1/1986 | Ochoa et al. ........................... | 260/369 |

*Primary Examiner*—Jose' G. Dees
*Assistant Examiner*—Alton Pryor
*Attorney, Agent, or Firm*—Burns, Doane, Swecker & Mathis, L.L.P.

[57] ABSTRACT

The invention concerns a method for regenerating a working solution for producing hydrogen peroxide 30%, in which the working solution is contacted with alumina at a temperature of approximately 40–160° C.

21 Claims, No Drawings

METHOD FOR REGENERATING ANTHRAQUINONE DERIVATIVES DURING A SYNTHESIS PROCESS OF HYDROGEN PEROXIDE 30 %

This application is a 371 of PCT/FR97/01909 filed Oct. 24, 1997.

The present invention relates to the process for preparing hydrogen peroxide from quinone compounds, and more specifically to a novel means for treating the working solutions used in this manufacturing process.

The common process for manufacturing hydrogen peroxide is the one known as the anthraquinone process. This process generally uses a mixture of substituted anthraquinone and anthrahydroquinone compounds such as, for example, 2-ethylanthraguinone (EAQ), 2-ethyl-5,6,7,8-tetrahydroanthraquinone (THEAQ), 2-ethylanthrahydroquinone (EAHQ) and 2-ethyl-5,6,7,8-tetrahydroanthrahydroquinone (THEAHQ). These compounds are generally dissolved in a mixture of polar and/or apolar solvents, the whole constituting what is conventionally referred to as the working solution.

This process for manufacturing hydrogen peroxide consists in carrying out successive reduction and oxidation cycles on the working solution.

Thus, according to the first step of the cycle, a catalytic hydrogenation of the working solution is carried out, which converts the anthraquinone into anthrahydroquinone. This hydrogenation is then followed by an assured oxidation in the presence of air, oxygen or a gaseous mixture containing oxygen. During this oxidation, the anthrahydroquinone is retrograded into anthraquinone with formation of hydrogen peroxide.

An extraction, generally in the presence of water, gives an aqueous hydrogen peroxide solution which can then be purified and concentrated.

In parallel, the working solution is regenerated in order to be used in the next oxidation/reduction cycle.

During the successive reduction and oxidation steps on the working solution, some of the starting anthraquinone compounds are slowly converted into degradation products which can have an influence on the yield for the synthesis of the hydrogen peroxide.

Thus, during the hydrogenation, side reactions lead in particular to oxathrones and anthranones, and, during the oxidation, to tetrahydroanthraquinone epoxides. These compounds are side products which give rise to an increase in the density and viscosity of the working solution and bring about deactivation of the hydrogenation catalyst, in the event of accumulation.

Moreover, during the reduction reactions, the starting anthraquinone compounds are converted into tetrahydroanthraquinones which give low degrees of oxidation, resulting in a loss of yield.

It is thus not recommended to use working solutions containing high proportions of these anthraquinone degradation products.

To solve this problem, U.S. Pat. No. 2,739,875 has proposed treating the working solutions, based on anthraquinone compounds and containing degradation products of these compounds, in order to regenerate them and reuse them in the process for the synthesis of hydrogen peroxide. According to that document, the working solution is placed in contact with activated alumina or magnesia while heating. The alumina has the effect of retrograding the anthraquinone degradation products into anthraquinone, in particular tetrahydroanthraquinone into anthraquinone and tetrahydroanthraquinone epoxides, and then into anthraquinone.

Patent FR 1,468,707 has also provided an improvement to this process for regenerating the working solution by proposing to use an alumina doped with an alkaline substance.

One aim of the present invention is to further improve the capacity of alumina to regenerate the anthraquinone degradation products and to ensure maintenance of the activity of the said alumina over a large number of regeneration cycles.

With this aim, the invention relates to a process for regenerating a working solution for the production of hydrogen peroxide, the said working solution containing at least one anthraquinone derivative and at least one degradation product of this derivative, this product being derived from successive reductions and oxidations of the working solution, in which process the working solution is placed in contact with alumina, the said alumina being obtained from a shaping operation by coagulation into drops or by extrusion.

The principle of the invention is thus based on the manner in which the alumina has been prepared, most particularly as regards its shaping. Thus, the regeneration process according to the invention uses an alumina which can be obtained according to several shaping operations.

According to a first embodiment, the alumina used can be alumina beads obtained from a shaping operation by coagulation into drops (or "oil-drop" operation). Beads of this type can be prepared, for example, by a process according to the teaching of patents EP-B-015,801 or EP-B-097,539. The porosity can be controlled in particular according to the process described in patent EP-B-097,539 by carrying out an oil-drop operation on an aqueous alumina suspension or dispersion or on a solution of a basic aluminium salt in the form of an emulsion consisting of an organic phase, an aqueous phase and a surfactant or an emulsifier. The said organic phase can be, in particular, a hydrocarbon, and the surfactant or emulsifier is, for example, Galoryl EM 10®.

The alumina beads used in the process according to the invention should not be derived from a process for shaping alumina by rotating technology. The term "rotating technology" refers to any apparatus in which aggregation takes place by placing the product to be granulated in contact with itself and rotating it. As apparatus of this type, mention may be made of a rotating granulator or a rotating drum.

According to a second embodiment of the invention, the alumina used can also be alumina extrudates. These are generally obtained by mixing and then extruding an alumina-based material, it being possible for the said material to be obtained from the rapid dehydration of hydrargillite or from the precipitation of boehmite or pseudo-boehmite alumina, and finally calcination. During the mixing, the alumina can be mixed with additives, such as porogenic agents. By way of example, the extrudates can be prepared by the preparation process described in U.S. Pat. No. 3,856,708.

It is generally preferred to use alumina extrudates rather than beads obtained from an oil-drop operation.

The alumina used in the process according to the invention preferably has a total pore volume (TPV) of at least 0.25 ml/g, preferably of at least 0.40 ml/g.

This total pore volume (TPV) is measured in the following way. The value of the grain density and of the absolute density are determined, the grain density (Dg) and absolute density (Da) being measured, respectively, by the method of picnometry with mercury and helium. The TPV is then given by the formula:

$$1/D_g - 1/D_a$$

Aluminas with a particle size of not more than 5 mm, preferably not more than 3.5 mm and even more advantageously not more than 2.4 mm, are generally used. In the case of shaping by an oil-drop operation, the particle size corresponds to the diameter of the beads, and, in the case of extrudates, it corresponds to the diameter of their transverse cross section.

Preferably, the alumina has a specific surface of at least 10 $m^2/g$, preferably of at least 50 $m^2/g$.

This specific surface is an area measured by the BET method.

The expression "area measured by the BET method" refers to the specific surface determined by adsorption of nitrogen in accordance with ASTM standard D 3663-78 established by the Brunauer-Emmett-Teller method described in the periodical "Journal of the American Chemical Society", 60, 309 (1938).

The process according to the invention preferably uses an alumina comprising at least one compound of an element chosen from alkali metals, rare-earth metals and alkaline-earth metals.

This compound can be an oxide, a hydroxide, a salt or a mixture thereof. In addition to the hydroxides, mention may also be made, for example, of sulphates, nitrates, halides, acetates, formates, carbonates and carboxylic acid salts.

The elements chosen from sodium, potassium, calcium and lanthanum are preferably used.

The alkali metal, rare-earth metal and/or alkaline-earth metal content is generally at least 15 mmol per 100 g of alumina, preferably at least 30 mmol, even more preferably between 30 and 400 mmol, advantageously between 30 and 160 mmol.

This compound can be deposited onto or in the alumina by any method known to those skilled in the art. This can be carried out, for example, by impregnating the already prepared alumina with the alkali metal, rare-earth metal or alkaline-earth metal elements or precursors of these elements, or by mixing the alkali metal, rare-earth metal or alkaline-earth metal elements or precursors with the alumina during the shaping of these materials. These elements can also be introduced into the alumina by coprecipitation of the alumina and the alkali metal, rare-earth metal or alkaline-earth metal elements or precursors thereof.

In the case of a deposition by impregnation, this takes place in a known manner by placing the alumina in contact with a solution, a sol or a gel comprising at least one alkali metal, rare-earth metal or alkaline-earth metal element in oxide or salt form or in the form of a precursor thereof.

The operation is generally carried out by soaking the alumina in a determined volume of solution of at least one precursor of an alkali metal, rare-earth metal or alkaline-earth metal element. The expression "solution of a precursor of one of these elements" refers to a solution of a salt or compound of the element, or of at least one of the alkali metal, rare-earth metal or alkaline-earth metal elements, these salts and compounds being thermally decomposable.

The salt concentration of the solution is chosen as a function of the amount of element to be deposited on the alumina.

According to a preferred embodiment, these elements are deposited by dry impregnation, i.e. the impregnation is carried out with just the volume of solution required for the said impregnation, without any excess.

The alumina can then be subjected to a drying operation and optionally a calcination. For example, it can be calcined at a temperature of between 150 and 1000° C., preferably between 300 and 800° C.

When the elements are deposited during the shaping operation, these elements or the precursors thereof are mixed with the alumina before it is shaped.

The regeneration process according to the invention is particularly suitable when the degradation product derived from the anthraquinone is a tetrahydroanthraquinone, an anthranone or a tetrahydroanthraquinone epoxide.

According to the process of the invention, the working solution to be regenerated is placed in contact with the alumina at a temperature of between about 40 and about 160° C. This regeneration can be carried out continuously, such that this step can form an integral part of the continuous synthesis process, for example by regenerating some of the working solution at each reduction/oxidation cycle, and then by reintroducing it into the next cycle.

Compounds other than those mentioned above can be used for the synthesis of hydrogen peroxide, and in particular:

2-t-butylanthraquinone, 2-sec-amylanthraquinone and the corresponding 5,6,7,8-tetrahydroanthraquinones thereof, 2-alkyl-1,2,3,4-tetrahydroanthraquinones, 1-alkyl-1,2,3,4-tetrahydroanthraquinones, 1-alkyl-5,6,7,8-tetrahydroanthraquinones, 1-alkenyl-5,6,7,8-tetrahydroanthraquinones, 2-methyl-6-amylanthraquinone, 2-methyl-7-amylanthraquinone, 2-t-amyltetrahydroanthraquinone, 2-sec-isoamyltetrahydroanthraquinone.

The examples which follow illustrate the invention without, however, limiting its scope.

EXAMPLES

The alumina samples tested are pretreated under a stream of nitrogen at 300° C. for 3 hours in order to remove any trace of moisture following their storage, and in order to be able to compare their efficiency under identical conditions.

4 g of alumina thus pretreated are introduced into 25 g of a 68% (by volume) hydrogenated working solution containing 1.2% (by weight) of tetrahydroethylanthraquinone epoxide and maintained at 72° C. After stirring for 3 hours, an analysis of the solution is carried out by chromatography and the degree of conversion of the epoxide is calculated.

The results and other data are collated in the table below.

| Alumina | Shaping | Particle size (mm) | Content of $Na_2O$ by weight | BET surface ($m^2/g$) | TPV (ml/g) | Degee of conversion (%) |
|---|---|---|---|---|---|---|
| 1 | RT* | 1.4–2.8 | 3710 ppm | 333 | 0.42 | 4 |
| 2 | RT* | 1.4–2.8 | 2% | 275 | 0.39 | 20 |
| 3 | ME* | 1.6 | 200 ppm | 218 | 0.58 | 33 |

-continued

| Alumina | Shaping | Particle size (mm) | Content of $Na_2O$ by weight | BET surface ($m^2$/g) | TPV (ml/g) | Degee of conversion (%) |
|---|---|---|---|---|---|---|
| 4 | ME* | 1.6 | 2% | 182 | 0.56 | 62 |
| 5 | ODO* | 1.8–2.1 | 2% | 174 | 0.60 | 58 |

RT*: rotating technology
ME*: mixing/extrusion
ODO*: oil-drop operation

What is claimed is:

1. Process for regenerating a working solution for the production of hydrogen peroxide, said working solution comprising at least one anthraquinone derivative and at least one degradation product of said derivative, said product being derived from successive reductions and oxidations of the working solution, wherein the working solution is placed in contact with alumina, characterized in that the said alumina is obtained from a shaping operation by extrusion.

2. Process according to claim 1, wherein the alumina has a total pore volume of at least 0.25 ml/g.

3. Process according to claim 1, wherein the alumina has a particle size of not more than 5 mm.

4. Process according to claim 1, wherein the alumina has a specific surface of at least 10 $m^2$/g.

5. Process according to claim 1, wherein the alumina comprises at least one compound of an element chosen from alkali metals, rare-earth metals and alkaline-earth metals.

6. Process according to claim 5, wherein the alkali metal, rare-earth metal and/or alkaline-earth metal content is at least 15 mmol per 100 g of alumina.

7. Process according to claim 1, wherein the degradation product of the anthraquinone derivative is a tetrahydroanthraquinone, an anthranone or a tetrahydroanthraquinone epoxide.

8. The process according to claim 2, wherein said alumina has a total pore volume of at least 0.40 ml/g.

9. The process according to claim 3, wherein said alumina has a particle size of not more than 3.5 mm.

10. The process according to claim 4, wherein said alumina has a specific surface of at least 50 $m^2$/g.

11. The process according to claim 6, wherein said alkali metal, rare-earth metal and/or alkaline-earth metal content is at least 30 mmol per 100 g of alumina.

12. The process according to claim 11, wherein said alkali metal, rare-earth metal and/or alkaline-earth metal content is between 30 and 400 mmol per 100 g of alumina.

13. The process according to claim 12, wherein said alkali metal, rare-earth metal and/or alkaline-earth metal content is between 30 and 160 mmol per 100 g of alumina.

14. A process for regenerating a working solution for the production of hydrogen peroxide, the process comprising:

placing the working solution in contact with alumina beads at a temperature of between 40 and 160° C.

15. A process for regenerating a working solution for the production of hydrogen peroxide, the process comprising:

placing the working solution in contact with shaped extruded alumina at a temperature of between 40 and 160° C.

16. The process of claim 14, wherein the alumina beads have a diameter no greater than 5 mm.

17. The process of claim 14, wherein the alumina beads have a diameter no greater than 3.5 mm.

18. The process of claim 14, wherein the alumina beads have a diameter no greater than 2.4 mm.

19. The process of claim 15, wherein the shaped extruded alumina has a transverse cross-sectional dimension no greater than 5 mm.

20. The process of claim 15, wherein the shaped extruded alumina has a transverse cross-sectional dimension no greater than 3.5 mm.

21. The process of claim 15, wherein the shaped extruded alumina has a transverse cross-sectional dimension no greater than 2.4 mm.

* * * * *